(12) United States Patent
Peng

(10) Patent No.: US 11,593,908 B2
(45) Date of Patent: Feb. 28, 2023

(54) METHOD FOR PREPROCESSING IMAGE IN AUGMENTED REALITY AND RELATED ELECTRONIC DEVICE

(71) Applicant: BEIJING BAIDU NETCOM SCIENCE AND TECHNOLOGY CO., LTD., Beijing (CN)

(72) Inventor: Cancan Peng, Beijing (CN)

(73) Assignee: APOLLO INTELLIGENT CONNECTIVITY (BEIJING) TECHNOLOGY CO., LTD., Beijing (CN)

(*) Notice: Subject to any disclaimer, the term of this patent is extended or adjusted under 35 U.S.C. 154(b) by 92 days.

(21) Appl. No.: 17/205,863

(22) Filed: Mar. 18, 2021

(65) Prior Publication Data

US 2021/0209721 A1 Jul. 8, 2021

(30) Foreign Application Priority Data

May 29, 2020 (CN) .......................... 202010476471.5

(51) Int. Cl.
*G06T 1/20* (2006.01)
*G06T 1/60* (2006.01)
(Continued)

(52) U.S. Cl.
CPC .................. *G06T 1/20* (2013.01); *G06T 1/60* (2013.01); *G06T 11/001* (2013.01); *G06T 15/005* (2013.01)

(58) Field of Classification Search
CPC . G06T 1/20; G06T 1/60; G06T 11/001; G06T 15/005; H04N 5/23229; H04N 2/232935
(Continued)

(56) References Cited

U.S. PATENT DOCUMENTS

2017/0295361 A1    10/2017  Dashwood
2018/0033114 A1*    2/2018  Chen ...................... G06T 15/80
(Continued)

FOREIGN PATENT DOCUMENTS

CN    106534880 A    3/2017
CN    107277616 A    10/2017
CN    108427499 A    8/2018

OTHER PUBLICATIONS

Jianbin Fang et al., "A Comprehesive Performance Comparison of CUDA and OpenCL", 2011 International Conferences on Parallel Processing, Sep. 13, 2011, 10 pages.
(Continued)

*Primary Examiner* — Jacinta M Crawford
(74) *Attorney, Agent, or Firm* — Lippes Mathias LLP

(57) ABSTRACT

The disclosure discloses a method for preprocessing an image and a related electronic device. A current data frame captured through a camera is obtained by a pre-created drawing surface window called by a central processing unit (CPU) in response to a preview activating instruction of the camera. The current data frame is converted into a preview texture corresponding to the current data frame by the pre-created drawing surface window. The preview texture corresponding to the current data frame is sent to a graphics processing unit (GPU). The preview texture corresponding to the current data frame is processed by the GPU. The preview texture processed is sent by the CPU to an advanced driving assistance system (ADAS).

17 Claims, 2 Drawing Sheets

---

S101 — obtaining a current data frame captured through a camera by a pre-created drawing surface window, wherein the pre-created drawing surface window is called by a central processing unit (CPU) in response to a preview activating instruction of the camera S102 — converting the current data frame into a preview texture corresponding to the current data frame by the pre-created drawing surface window S103 — sending the preview texture corresponding to the current data frame to a graphics processing unit (GPU), processing, by the GPU, the preview texture corresponding to the current data frame, and sending, by the CPU, the preview texture processed to an advanced driving assistance system (ADAS)

(51) Int. Cl.
*G06T 11/00* (2006.01)
*G06T 15/00* (2011.01)

(58) Field of Classification Search
USPC .................................................. 345/501, 582
See application file for complete search history.

(56) References Cited

U.S. PATENT DOCUMENTS

2018/0225846 A1* 8/2018 Kim .......................... G06T 1/60
2021/0192287 A1* 6/2021 Dwivedi .............. G06N 3/0454

OTHER PUBLICATIONS

Nardone et al., "A Look into the Future: Augmented reality (AR) and Android TV", Pro Androis Games: L. Edition, Chapter 9, Apress L.P., Jan. 1, 2015, 26 pages.
Simon McIntosh-Smith et al., "High Dynamic Range Computational Photography on Mobile GPUs", Chapter 16, Taylor & Francis Group, Jan. 1, 2018, 36 pages.
Valeriu Manuel Ionescu, "CPU and GPU gray scale image conversion on mobile platforms", ECAI 2017—International Conference—9th Edition, Electronics, Computers and Artificial Intelligence, Jun. 29, 2017, 6 pages.
Extended European Search Report for Application No. 21163317.7, dated Sep. 21, 2021, 11 pages.
Office Action for Chinese Patent Application No. 202010476471.5, dated May 17, 2021, 7 pages.

* cited by examiner

METHOD FOR PREPROCESSING IMAGE IN AUGMENTED REALITY AND RELATED ELECTRONIC DEVICE

CROSS REFERENCE TO RELATED APPLICATIONS

This application claims priority and benefits to Chinese Application No. 202010476471.5, filed on May 29, 2020, the entire content of which is incorporated herein by reference.

FIELD

The disclosure relates to a field of computer application technologies and further to a field of AR (augmented reality) navigation technologies, and particularly relate to a method and an apparatus for preprocessing an image, an electronic device, and a storage medium.

BACKGROUND

Augmented reality (AR) is also called mixed reality. Through an electronic technology, the AR applies virtual information to a real world, and a real environment and a virtual object are superimposed on a same picture or space in real time. The AR provides a kind of information which is different from human perception. The AR not only shows information of the real world, but also shows the virtual information at the same time, and the two kinds of information complement and overlap each other. In a visual augmented reality, a user may view a scene combining the real world with virtual graphics by utilizing a display. The AR is a technology that utilizes the virtual object to "enhance" the real scene. Comparing with the virtual reality, the AR has advantages of strong realism and less modeling workload.

SUMMARY

Embodiments of the disclosure provide a method for preprocessing an image, an electronic device and a non-transitory computer readable storage medium.

The method includes: obtaining a current data frame captured through a camera by a pre-created drawing surface window, in which the pre-created drawing surface window is called by a central processing unit (CPU) in response to a preview activating instruction of the camera; converting the current data frame into a preview texture corresponding to the current data frame by the pre-created drawing surface window; and sending the preview texture corresponding to the current data frame to a graphics processing unit (GPU), processing, by the GPU, the preview texture corresponding to the current data frame, and sending, by the CPU, the preview texture processed to an advanced driving assistance system (ADAS).

The electronic device includes: one or more processors and a memory. The memory is configured to store one or more programs. When the one or more programs are executed by the one or more processors, the one or more processors are caused to implement the above-described method for preprocessing an image.

The non-transitory computer readable storage medium has a computer program stored thereon. The above-described method for preprocessing an image is implemented when the computer program is executed by the processor.

It should be understood, description in Summary of the disclosure does not aim to limit a key or important feature in embodiments of the disclosure, and does not used to limit the scope of the disclosure. Other features of the disclosure will be easily understood by following descriptions.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

An advanced driving assistance system (ADAS) senses a surrounding environment, collects data, and identifies, detects and tracks a static object and a dynamic object at any time while the vehicle is driven by utilizing various sensors (such as a millimeter wave radar, a laser radar, a monocular camera or a binocular camera, and satellite navigation) installed on a vehicle. Then, computing and analysis of the system is performed in combination with map data of a navigator. In this way, a driver may sense possible dangers in advance, and the comfort and safety of automobile driving may be effectively increased.

In the AR navigation, for data sent to the ADAS, data captured by a camera is generally preprocessed by a CPU, and then sent to the ADAS for image recognition and algorithm processing. Since the CPU also needs to render the data captured by the camera, it is required to assign an additional thread to monitor the camera. That is, the CPU needs to obtain data of each image captured by the camera, and completes data scaling and color conversion on the data of each image in a callback process, and then sends the data of each image to the ADAS for the image recognition and the algorithm processing. The defects in the related art include the following. The CPU needs to assign an additional thread to monitor data of the camera, which increases memory consumption of the CPU. Moreover, the preprocessing is performed on the CPU, which occupies a part of CPU resources. Due to limited CPU resources, the timing of sending the data of each image to the ADAS may also be delayed by employing the solution in the related art, thereby causing a hysteresis of rendering the image by the AR and affecting an experience of the user.

Therefore, embodiments of the disclosure provide a method and an apparatus for preprocessing an image, a related electronic device and a related storage medium.

Figure 1:
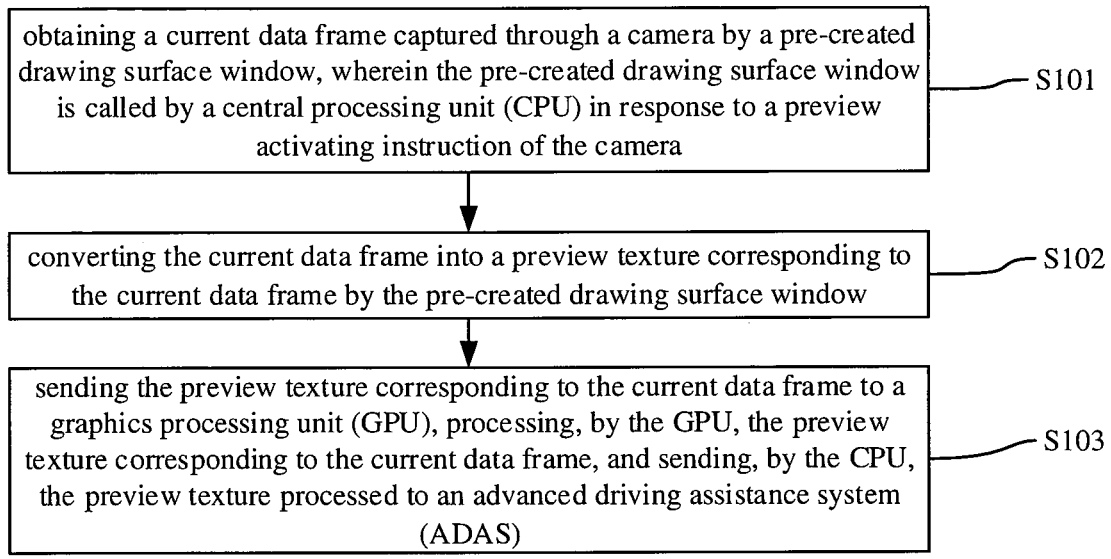
FIG. 1 is a flow chart illustrating a method for preprocessing an image according to embodiments of the disclosure.

FIG. 1 is a flow chart illustrating a method for preprocessing an image according to embodiments of the disclosure. The method may be executed by an apparatus for preprocessing an image or an electronic device. The apparatus or the electronic device may be implemented by software and/or hardware. The apparatus or the electronic device may be integrated in any intelligent device with a network communication function. As illustrated in FIG. 1, the method for preprocessing the image may include the following.

At block S101, a current data frame captured through a camera is obtained by a pre-created drawing surface window called by a central processing unit (CPU) in response to a preview activating instruction of the camera.

In some embodiments of the disclosure, the electronic device may be configured to obtain the current data frame captured through the camera by the pre-created drawing surface window called by the CPU in response to the preview activating instruction of the camera. The pre-created drawing surface window may be a preset type of drawing surface window. The preset type of drawing surface window may be SurfaceTexture. In detail, the electronic device may be configured to create a graphics library (GL) thread by calling a thread creation function (e.g., setRenderer). In addition, the electronic device may be configured to set a window management environment of an open graphics library (OpenGL) of the GL thread by calling a start function (e.g., Start) of the GL thread through the GL thread. Furthermore, the electronic device may be configured to create the drawing surface window (e.g., SurfaceTexture) for camera preview as the pre-created drawing surface window in the GL thread for setting the window management environment of the OpenGL. The current data frame captured by the camera is obtained by the pre-created drawing surface window called. In detail, the window management environment of the OpenGL in the disclosure may be an EGL (embedded graphic interface) environment. The EGL is an interface between a rendering application programming interface (API) and a native platform window system. Generally, the OpenGL is the API for operating a graphics processing unit (GPU). The OpenGL sends a relevant instruction to the GPU through a driver to control a running state of a state machine of a graphics rendering pipeline. However, due to the interaction with the native platform window system, an intermediate layer is required, and the intermediate layer is preferably platform-independent. Therefore, the EGL is designed as a bridge between the OpenGL and the native platform window system.

At block S102, the current data frame is converted into a preview texture corresponding to the current data frame by the drawing surface window.

In some embodiments of the disclosure, the electronic device may be configured to convert the current data frame into the preview texture corresponding to the current data frame by the drawing surface window. The pre-created drawing surface window may be a preset type of drawing surface window. The preset type of drawing surface window may be the SurfaceTexture. Generally, the OpenGL is the API for operating the GPU. The OpenGL sends the relevant instruction to the GPU through the driver to control the running state of the state machine of the graphics rendering pipeline. However, when the OpenGL interacts with the native platform window system, the intermediate layer is required, and the intermediate layer is preferably independent of the platform. Therefore, the EGL is designed as the bridge between the OpenGL and the native platform window system. In this block, the electronic device may be configured to associate the pre-created drawing surface window with a predetermined type of texture. The predetermined type of texture may be an OES (open embedded system) texture. In this way, the current data frame may be converted to the preview texture corresponding to the current data frame by calling an updateTexImage.

At block S103, the preview texture corresponding to the current data frame is sent to the GPU, the preview texture corresponding to the current data frame is processed by the GPU, and the processed preview texture is sent to an advanced driving assistance system (ADAS) by the CPU.

In some embodiments of the disclosure, the electronic device may be configured to send the preview texture corresponding to the current data frame to the GPU. The preview texture corresponding to the current data frame may be processed through the GPU. The processed preview texture may be sent to the ADAS through the CPU. In detail, the electronic device may be configured to convert a color of the preview texture corresponding to the current data frame within a storage space occupied by the GPU by calling a preset shader by the GPU. In some embodiments, the electronic device may be configured to convert a pixel format of the preview texture corresponding to the current data frame within the storage space occupied by the GPU. In some embodiments, the electronic device may be configured to scale a size of the preview texture corresponding to the current data frame within the storage space occupied by the GPU.

With the method for preprocessing the image according to embodiments of the disclosure, the current data frame captured through the camera is obtained by the pre-created drawing surface window called by the CPU in response to the preview activating instruction of the camera. The current data frame is converted into the preview texture corresponding to the current data frame by the pre-created drawing surface window. The preview texture corresponding to the current data frame is sent to the GPU. The preview texture corresponding to the current data frame is processed by the GPU. The processed preview texture is sent to the ADAS by the CPU. In other words, with the disclosure, the drawing surface window may be created in advance, and the current data frame is converted into the preview texture corresponding to the current data frame through the pre-created drawing surface window. In this way, the preview texture corresponding to the current data frame may be processed in the GPU, and the processed preview texture may be sent to the ADAS through the CPU. Therefore, the processed preview texture may be recognized and detected by the ADAS. However, in an existing method for preprocessing an image, the data captured by the camera is generally preprocessed by the CPU, and the preprocessed data is sent to the ADAS for image recognition and algorithm processing. In this way, the CPU needs to additionally assign a thread to monitor camera data. With the disclosure, the preview texture corresponding to the current data frame is processed in the GPU, and the processed preview texture is sent to the ADAS. Therefore, the technical problem existing in the related art that the CPU needs to additionally assign a thread to monitor the camera data may be solved, and an effect that the image may be proposed without assigning an additional thread to monitor the camera data by the CPU may be achieved, thereby effectively saving the CPU resources and improving preprocessing speed. The technical solution according to embodiments of the disclosure is simple and convenient, such that the popularization is convenient and the application range is wide.

Figure 2:
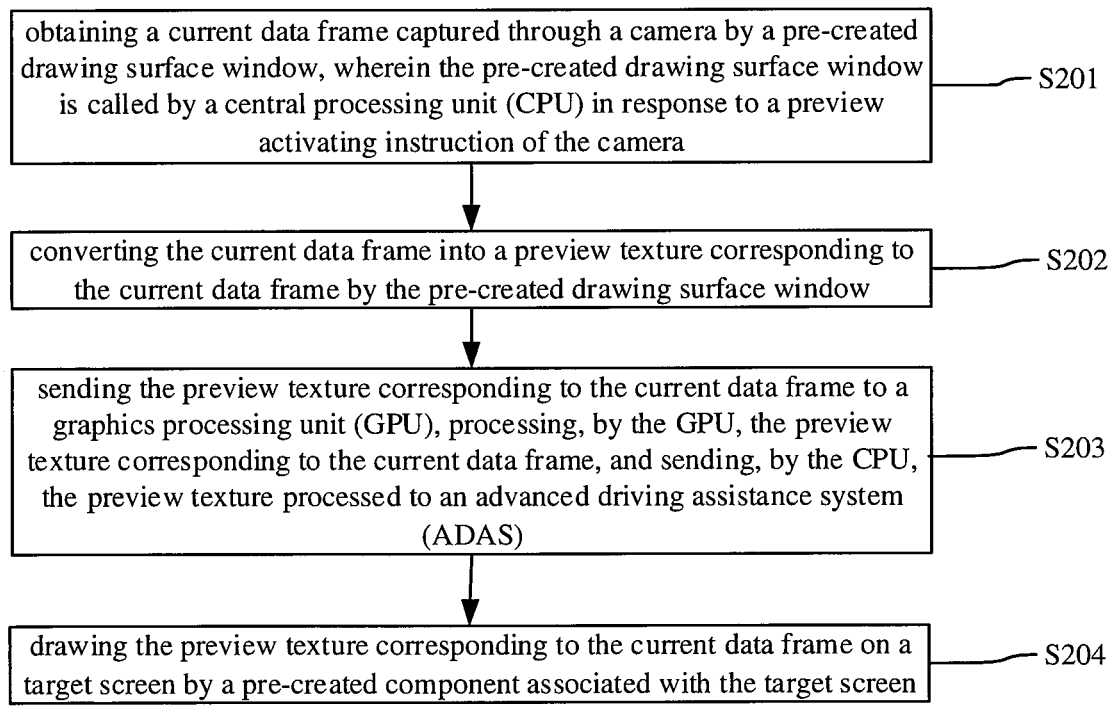
FIG. 2 is a flow chart illustrating a method for preprocessing an image according to embodiments of the disclosure.

FIG. 2 is a flow chart illustrating a method for preprocessing an image according to embodiments of the disclosure. As illustrated in FIG. 2, the method for preprocessing the image may include the following.

At block S201, a current data frame captured through a camera is obtained by a pre-created drawing surface window called by a CPU in response to a preview activating instruction of the camera.

In some embodiments of the disclosure, the electronic device may be configured to obtain the current data frame captured through the camera by the pre-created drawing surface window called by the CPU in response to the preview activating instruction of the camera. The pre-created drawing surface window may be a preset type of drawing surface window. The preset type of drawing surface window may be SurfaceTexture. In detail, the electronic device may be configured to create a GL thread by calling a thread creation function (e.g., setRenderer). In addition, the electronic device may be configured to set a window management environment of an OpenGL of the GL thread by calling a start function (e.g., Start) of the GL thread through the GL thread. Furthermore, the electronic device may be configured to create the drawing surface window (e.g., SurfaceTexture) for camera preview as the pre-created drawing surface window in the GL thread for setting the window management environment of the OpenGL. The current data frame captured by the camera is obtained by the pre-created drawing surface window called. In detail, the window management environment of the OpenGL in the disclosure may be an EGL environment. An EGL is an interface between a rendering API and a native platform window system.

At block S202, the current data frame is converted into a preview texture corresponding to the current data frame by the pre-created drawing surface window.

In some embodiments of the disclosure, the electronic device may be configured to convert the current data frame into the preview texture corresponding to the current data frame by the pre-created drawing surface window. The pre-created drawing surface window may be a preset type of drawing surface window. The preset type of drawing surface window may be the SurfaceTexture. Generally, the OpenGL is the API for operating the GPU. The OpenGL sends a relevant instruction to the GPU through a driver to control a running state of a state machine of a graphics rendering pipeline. However, when the OpenGL interacts with a native platform window system, an intermediate layer is needed, and the intermediate layer is preferably platform-unrelated. Therefore, an EGL is designed as a bridge between the OpenGL and the native platform window system. In this block, the electronic device may be configured to associate the pre-created drawing surface window with a predetermined type of texture. The predetermined type of texture may be an OES texture. In this way, the current data frame may be converted to the preview texture corresponding to the current data frame by calling an updateTexImage.

The OpenGL is a graphics application programming interface, which is a software library that may access graphics hardware characteristics. The OpenGL is designed as a modern and hardware-independent interface. Therefore, without considering the computer operating system or the window system, the OpenGL interface may be implemented entirely by software on various graphics hardware systems.

The OpenGL neither include any function for performing a window task or processing a user input, nor provide any operation for expressing a three-dimensional physical model or reading an image file (such as a PNG file or a JPEG file). Main operations of rendering an image by an OpenGL program may include the following. 1) A shape is formed by setting data for geometric primitives of the OpenGL. 2) Positions, colors and other rendering attributes of the geometric primitives are determined by using different shaders to perform calculation operations on the primitive data. 3) A mathematical expression of the primitive data is converted into a pixel fragment corresponding to a screen position, which is also called as a process of "rasterization". The fragment of the OpenGL is the pixel in a case that the fragment is rendered to obtain an image. 4) For the fragment generated by the process of "rasterization", the final color and position of the fragment may be determined by executing a fragment shader.

The EGL is an intermediate interface layer between an OpenGL ES rendering API and the native platform window system, which is mainly implemented by a system manufacturer. The EGL may communicate with the native platform window system of the device, query available types and available configurations of the drawing surface window, create the drawing surface window, perform synchronization rendering on the OpenGL ES and other graphics rendering API, and manage rendering resources of such as texture mapping. To make OpenGL ES to draw on a device, the EGL is required as a bridge between the OpenGL ES and the device. The EGL may communicate with a local window, query effective types and effective configurations for drawing a drawing surface window (e.g., Surface), create the drawn Surface, create Context to manage the rendering resources (such as Shader array data of the OpenGL ES), output data rendered by the OpenGL ES to the Surface, and output contents of the Surface to the local window. The EGL may be used based on the following. 1) A display object of the EGL is obtained. In some embodiments, The EGL provides EGLDisplay. The EGLDisplay is encapsulated with all APIs for operating the local window. Therefore, creating and initializing a connection with the EGLDisplay is required when using the EGL. 2) Initializing the EGL is required after successfully connecting with the EGLDisplay. In some example, an initialize function (e.g., eglInitialize) of the EGL may be called to initialize the EGL. 3) Types and the configurations for rendering the Surface may be obtained after the initialization of the EGL. For example, the configuration (e.g., EGLConfig) of the EGL may include all configuration information about the Surface. The configuration information may include, such as, the number of available colors, additional buffers (such as depth buffers and template buffers) related to the configuration, the types of the Surface and others. 4) An instance of EGL context (e.g., EGLContext) is created. A structure of the EGLContext includes all states and required operations of the OpenGL ES 2. For example, the structure of the EGLContext includes array data used by the vertex and the fragment shader. It is required to create the EGLContext in advance before the OpenGL ES 2 performs drawing. 5) An instance of an EGL drawing surface window (e.g., EGLSurface) is created. The EGLSurface may be created based on the EGLConfig after the EGLConfig is created. The EGLSurface may be a storage space, and information to be drawn by the user may be drawn on the EGLSurface. 6) The EGLContext is associated with the EGLSurface. Based on the above operations, the EGLContext and the EGLSurface are obtained, and the obtained EGLContext with the EGLSurface are associated with each other. In this way, the EGL may control the OpenGL ES to read Shader data from the EGLContext and draw content on the EGLSurface.

At block S203, the preview texture corresponding to the current data frame is sent to a GPU, the preview texture corresponding to the current data frame is processed by the GPU, and the processed preview texture is sent to an ADAS by the CPU.

In some embodiments of the disclosure, the preview texture corresponding to the current data frame is sent to GPU. The preview texture corresponding to the current data frame is processed through the GPU. The processed preview texture is sent to the ADAS by the CPU. In detail, the electronic device may be configured to convert a color of the preview texture corresponding to the current data frame within a storage space occupied by the GPU by calling a preset shader by the GPU. In some embodiments, the electronic device may be configured to convert a pixel format of the preview texture corresponding to the current data frame within the storage space occupied by the GPU. In some embodiments, the electronic device may be configured to scale a size of the preview texture corresponding to the current data frame within the storage space occupied by the GPU. Further, the electronic device may be configured to copy the processed preview texture from the GPU to the CPU through a preset graphics buffer, and send the processed preview texture to the ADAS through the CPU. For example, the preset graphics buffer is the HardwareBuffer, and thus the electronic devices may efficiently copy the data from the GPU to the CPU through the HardwareBuffer.

Converting the color of the preview texture may be described in detail below. The AR (augmented reality) technology may apply virtual information to a real world, and overlay an environment of the real world and a virtual object on a same picture or space in real time, thereby greatly improving interest and playability of the user. In some application scenes, such as a live broadcast field, a live broadcast interface of an author may be displayed by the AR technology to enrich an interaction between the author and audiences. A way for converting the color according to the disclosure may include: obtaining a texture object and a color conversion matrix corresponding to a current video frame; processing the texture object and the color conversion matrix by utilizing a shader; generating RGB (red, green and blue) data corresponding to the current data frame; and performing rendering based on the RGB data.

Converting the pixel format of the preview texture will be described in detail below. A RGB format needs to be converted into a YUV format when coding is performed on a signal in a digital video compression format (such as H.264). The RGB format and the YUV format will be described firstly. The RGB format is a color standard in industry, which is a format representing different colors by changing values of the red (R) channel, the green (G) channel and the blue (B) channel and combining the values of the three color channels with each other. The RGB represents red, green and blue channels. This color standard includes almost all colors that human vision may perceive, and is one of most widely used color systems. The YUV is a method of color coding, including three components. The "Y" represents luminance (or luma), i.e., a gray value. The "U" and the "V" represent chrominance (or chroma), which are used to describe a color and a saturation of the image, and are used to specify the color of pixels. The YUV format is mainly used in a television (TV) system and an analog video field. The YUV format separates the luminance information (Y) from color information (UV). An image may also be displayed without the color information (UV), but the image is displayed in black and white form. Such design well solves a compatibility problem between a color TV and a black-and-white TV Moreover, the YUV format, not same as the RGB format, does not need to simultaneously transmit three independent video signals, such that a small bandwidth is occupied by data transmission in the YUV format. A storage format of a code stream in the YUV format is closely related to a sampling method of the code stream in the YUV format. There are three mainstream sampling methods, including YUV4:4:4, YUV4:2:2, YUV4:2:0. The YUV format has two categories, including the planar format and the packed format. For the planar format, Y of all pixels is stored continuously, and then U of all the pixels is stored, and finally V of all the pixels is stored. For the packed format, the Y, U, V of each pixel are alternatively stored. A relevant algorithm is required to execute on the CPU of the computer when the pixel in the RGB format is converted to the pixel in the YUV format for H.264 coding. As a core of performing computer tasks, the CPU needs to perform other tasks while converting the pixel format. In other words, the maximum bandwidth of the data transmission on the CPU is hard to be utilized for the conversion of the pixel format, thereby prolonging a calculation process of the conversion of the pixel format and reducing the efficiency of the conversion of the pixel format. With the disclosure, the pixel format of the image may be converted from ARGB to NV12 on the GPU, thereby shortening the calculation process of the conversion of the pixel format is shorten and improving the efficiency of the conversion of the pixel format. The method for converting the pixel format according to the disclosure may include: creating a storage texture of a Y plane in an eight-bit pixel format and a storage texture of a UV plane in a 16-bit pixel format at a two-dimensional texture interface of the graphical programming interface; inputting a storage texture of the ARGB pixel format to be converted into the GPU; converting, by the GPU, an image in the storage texture of the ARGB pixel format to an image of the NV12 pixel format via a HLSL language; assigning a value of a Y plane of the image of the NV12 pixel format as the storage texture of the Y plane; and assigning a value of a UV plane of the image of the NV12 pixel format as the storage texture of the UV plane.

Scaling the size of the preview texture may be described in detail below. Generally, in a program of a mobile phone or a computer client, a display area of a window component is a right-angled rectangle. The computer program may determine the display area of the right-angled rectangle by defining vertexes or the length and width of the rectangle. However, in some application scenes, in order to adapt a theme style of an operating system or an application page, the display area of a video may be designed as a rounded rectangle. An existing way is to use the CPU to cut corners of a video frame. For the rounded areas, multiple triangles may be generated in the rounded area such that bottom edges of the multiple triangles may be closely approximates to the rounded area. When there is a small number of triangles, a jagged edge may be seen in visual perception. The more the number of triangles, the smoother the edge of the rounded area is, and the jagged edge may not be seen in the visual perception. Therefore, in order to prevent the jagged edge of the rounded rectangle and to achieve a better viewing effect, the CPU resources may be generally used to generate more triangles in the related art. In this way, CPU usage is greatly consumed. In order to provide the image display region with the rounded area or the image display area with an arbitrary shape while reducing utilization rate of the processor and the memory and improving utilization rate of the computer resources, the method for scaling the size according to the disclosure may include: obtaining a texture area and vertex coordinates of the image display area; inputting the vertex coordinates into a vertex shader of the GPU by calling a graphics program interface; obtaining a pixel shader corresponding to the vertex shader; sampling values of pixels whose positions belong to the texture area in a target image; and rendering the values of pixels to corresponding positions in the texture area through the pixel shader.

At block S204, the preview texture corresponding to the current data frame is drawn on a target screen by a pre-created component associated with the target screen.

In some embodiments of the disclosure, the electronic device may be configured to draw the preview texture corresponding to the current data frame on the target screen by the pre-created component associated with the target screen. In some embodiments, the pre-created component associated with the target screen may be SurfaceView. In detail, the electronic device may be configured to set a drawing surface window in the pre-created component associated with the target screen as the pre-created drawing surface window, and draw the preview texture corresponding to the current data frame on the target screen by setting the drawing surface window as the component of the pre-created drawing surface window. Further, for the target screen, the electronic device may create an EGLSurface associated with the SurfaceView of the target screen, and then draw the preview texture corresponding to the current data frame on the target screen via the EGLSurface associated with the SurfaceView of the target screen. In detail, the electronic device may set the Surface of the EGLSurface associated with the SurfaceView of the target screen as a pre-created SurfaceTexture, and then draw the preview texture corresponding to the current data frame on the target screen by setting the Surface of the EGLSurface as the EGLSurface of the pre-created SurfaceTexture. For example, for the target screen, the electronic device may create the EGLSurface associated with the SurfaceView of the target screen, and set the Surface of the EGLSurface associated with the SurfaceView of the target screen as the pre-created SurfaceTexture. In addition, the electronic device may obtain the current data frame through the SurfaceTexture in the GL thread. Furthermore, the electronic device may obtain the preview texture corresponding to the current data frame by calling an updateTexImage, and draw the preview texture corresponding to the current data frame on a screen 1 through the OpenGL. In detail, the SurfaceView may provide a Surface, and the Surface is embedded in a view structure hierarchy. A format of the Surface may be controlled by a programmer. The SurfaceView is configured to arrange the Surface correctly at a corresponding position of the screen. The SurfaceView has its own Surface and the Surface is separated from a host window. The difference between the SurfaceTexture and the SurfaceView is that the SurfaceTexture does not directly display the processing of an image stream, but transforms the image stream into a GL external texture. Therefore, the SurfaceTexture may be used to secondary processing of the image stream (such as a camera filter and a desktop special effect). In detail, the SurfaceTexture may obtain frame data from the image stream (obtained from the camera preview, video decoding, a GL drawing scene). When the updateTexImage is called, the GL texture object corresponding to the SurfaceTexture is updated based on a most recent image in a content stream. The GL texture object may be operated in a way similar to operating a conventional GL texture.

In some embodiments of the disclosure, the block S204 may be executed after the block S203, or may be simultaneously executed as the block S203. The disclosure does not limit the execution order of the rendering operation and the preprocessing operation.

In some embodiments, the method for preprocessing the image according to the disclosure may be applied to an AR navigation scene. The AR is a technology that uses the virtual object to "enhance" the real scene. Comparing with the virtual reality, the AR has advantages of strong reality sense and less modeling workload. With the technical solution according to the disclosure, the drawing surface window for receiving the camera data in the related art may be seamlessly replaced and the camera data may be preprocessed quickly, only by adding an interface to a hardware abstraction layer of the camera.

With the method for preprocessing the image according to embodiments of the disclosure, the current data frame captured through the camera is obtained by the pre-created drawing surface window called by the CPU in response to the preview activating instruction of the camera. The current data frame is converted into the preview texture corresponding to the current data frame by the pre-created drawing surface window. The preview texture corresponding to the current data frame is sent to the GPU. The preview texture corresponding to the current data frame is processed by the GPU. The processed preview texture is sent to the ADAS by the CPU. In other words, with the disclosure, the drawing surface window may be created in advance, and the current data frame is converted into the preview texture corresponding to the current data frame through the pre-created drawing surface window. In this way, the preview texture corresponding to the current data frame may be processed in the GPU, the processed preview texture may be sent to the ADAS through the CPU, and the processed preview texture may be recognized and detected by the ADAS. However, in an existing method for preprocessing an image, the data captured by the camera is generally preprocessed by the CPU, and the preprocessed data is sent to the ADAS for image recognition and algorithm processing. In this way, the CPU needs to additionally assign a thread to monitor the camera data. With the disclosure, the preview texture corresponding to the current data frame is processed in the GPU, and the processed preview texture is sent to the ADAS. Therefore, the technical problem existing in the related art that the CPU needs to additionally assign a thread to monitor the camera data may be solved, and an effect that the image may be proposed without assigning an additional thread to monitor the camera data by the CPU may be achieved, thereby effectively saving the CPU resources and improving preprocessing speed. The technical solution according to embodiments of the disclosure is simple and convenient, such that the popularization is convenient and the application range is wide.

Figure 3:
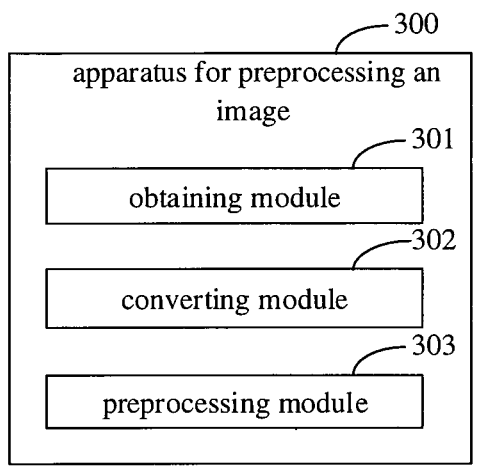
FIG. 3 is a block diagram illustrating an apparatus for preprocessing an image according to embodiments of the disclosure.

FIG. 3 is a block diagram illustrating an apparatus for preprocessing an image according to embodiments of the disclosure. As illustrated in FIG. 3, the apparatus 300 includes: an obtaining module 301, a converting module 302, and a preprocessing module 303.

The obtaining module 301 is configured to obtain a current data frame captured through a camera by a pre-created drawing surface window. The pre-created drawing surface window is called by a CPU in response to a preview activating instruction of the camera. The converting module 302 is configured to convert the current data frame into a preview texture corresponding to the current data frame by the pre-created drawing surface window. The preprocessing module 303 is configured to send the preview texture corresponding to the current data frame to a GPU, to process, by the GPU, the preview texture corresponding to the current data frame, and to send, by the GPU, the preview texture processed to an ADAS.

Further, the converting module 302 is configured to: associate the pre-created drawing surface window with a predetermined type of texture; and convert the current data frame into the preview texture corresponding to the current data frame by the pre-created drawing surface window associated with the predetermined type of texture.

Further, the preprocessing module 303 is configured to: convert a color of the preview texture corresponding to the current data frame within a storage space occupied by the GPU by calling a preset shader by the GPU; convert a pixel format of the preview texture corresponding to the current data frame within the storage space occupied by the GPU; or scale a size of the preview texture corresponding to the current data frame in the storage space occupied by the GPU.

Further, the preprocessing module 303 is configured to: copy the preview texture processed from the GPU to the CPU by a preset graphics buffer, and send the preview texture processed to the ADAS by the CPU.

Further, the apparatus also includes: a drawing module 304 (not illustrated in the accompanying drawings). The drawing module is configured to draw the preview texture corresponding to the current data frame on a target screen by a pre-created component associated with the target screen.

Further, the drawing module 304 is configured to: set a drawing surface window in the pre-created component associated with the target screen as the pre-created drawing surface window; and draw the preview texture corresponding to the current data frame on the target screen by setting the drawing surface window as the component of the pre-created drawing surface window.

Further, the obtaining module 301 is also configured to: create a graphics library thread by calling a thread creation function, and configure a window management environment of an open graphics library of the graphics library thread by calling a start function through the graphics library thread; and create a drawing surface window for camera preview as the pre-created drawing surface window in the graphics library thread for configuring the window management environment of the open graphics library.

The apparatus for preprocessing the image may execute the method for preprocessing the image according to any one of embodiments of the disclosure, and have corresponding functional modules and beneficial effects of the execution method. For technical details not described in detail in this embodiment, please refer to the method for preprocessing the image according to any one of embodiments of the disclosure.

According to embodiments of the disclosure, the disclosure also provides an electronic device and a readable storage medium.

Figure 4:
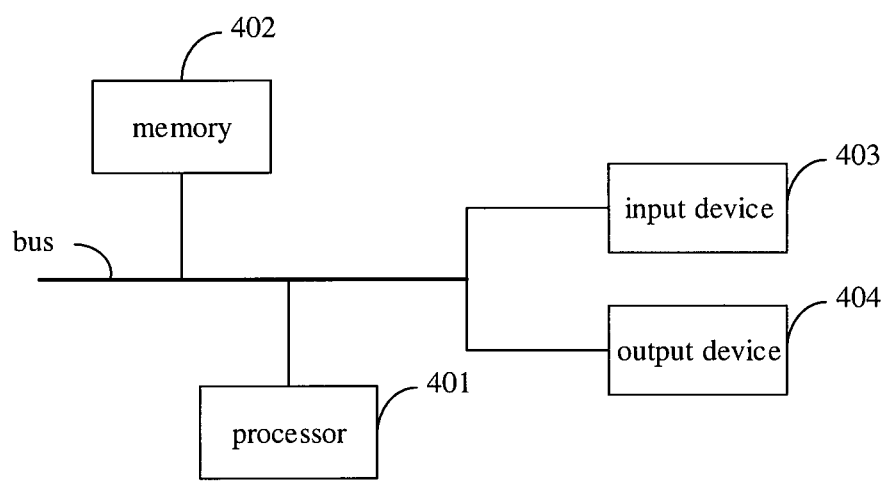
FIG. 4 is a block diagram illustrating an electronic device capable of implementing a method for preprocessing an image according to embodiments of the disclosure.

As illustrated in FIG. 4, FIG. 4 is a block diagram illustrating an electronic device capable of implementing a method for preprocessing an image according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 4, the electronic device includes: one or more processors 401, a memory 402, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 4, a processor 401 is taken as an example.

The memory 402 is a non-transitory computer readable storage medium provided by the disclosure. The memory is configured to store instructions executable by at least one processor, to enable the at least one processor to execute the method for preprocessing the image provided by the disclosure. The non-transitory computer readable storage medium provided by the disclosure is configured to store computer instructions. The computer instructions are configured to enable a computer to execute the method for preprocessing the image provided by the disclosure.

As the non-transitory computer readable storage medium, the memory 402 may be configured to store non-transitory software programs, non-transitory computer executable programs and modules, such as program instructions/module (such as the obtaining module 301, the converting module 302, and the preprocessing module 303 illustrated in FIG. 3) corresponding to the method for preprocessing the image according to embodiments of the disclosure. The processor 401 is configured to execute various functional applications and data processing of the server by operating non-transitory software programs, instructions and modules stored in the memory 402, that is, implements the method for preprocessing the image according to the above method embodiments.

The memory 402 may include a storage program region and a storage data region. The storage program region may store an application required by an operating system and at least one function. The storage data region may store data created according to predicted usage of the electronic device based on the semantic representation. In addition, the memory 402 may include a high-speed random access memory, and may also include a non-transitory memory, such as at least one disk memory device, a flash memory device, or other non-transitory solid-state memory device. In some embodiments, the memory 402 may optionally include memories remotely located to the processor 401, and these remote memories may be connected to the electronic device via a network. Examples of the above network include, but are not limited to, an Internet, an intranet, a local area network, a mobile communication network and combinations thereof.

The electronic device capable of implementing the method for preprocessing the image may also include: an input device 403 and an output device 404. The processor 401, the memory 402, the input device 403, and the output device 404 may be connected via a bus or in other means. In FIG. 4, the bus is taken as an example.

The input device 403 may receive inputted digital or character information, and generate key signal input related to user setting and function control of the electronic device capable of implementing the method for preprocessing the image, such as a touch screen, a keypad, a mouse, a track pad, a touch pad, an indicator stick, one or more mouse buttons, a trackball, a joystick and other input device. The output device 404 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

With the technical solution according to embodiments of the disclosure, the current data frame captured through the camera is obtained by the pre-created drawing surface window. The pre-created drawing surface window is called by the CPU in response to the preview activating instruction of the camera. The current data frame is converted into the preview texture corresponding to the current data frame by the pre-created drawing surface window. The preview texture corresponding to the current data frame is sent to the GPU. The preview texture corresponding to the current data frame is processed by the GPU. The processed preview texture is sent to the ADAS by the CPU. In other words, with the disclosure, the drawing surface window may be created in advance, and the current data frame is converted into the preview texture corresponding to the current data frame through the pre-created drawing surface window. In this way, the preview texture corresponding to the current data frame may be processed in the GPU, the processed preview texture may be sent to the ADAS through the CPU, and then the processed preview texture may be recognized and detected by the ADAS. However, in an existing method for preprocessing an image, the data captured by the camera is generally preprocessed by the CPU, and then sent to the ADAS for image recognition and algorithm processing. In this way, the CPU needs to assign an additional thread to monitor camera data of the camera. With the disclosure, the preview texture corresponding to the current data frame is processed in the GPU, and then the processed preview texture is sent to the ADAS. Therefore, the technical problem in the related art that the CPU needs to assign an additional thread to monitor the camera data is overcome, and an effect that the CPU does not need to assign an additional thread to monitor the camera data is further achieved. The image preprocessing may be implemented, CPU resources may be effectively saved, and the preprocessing speed is improved. With the technical solution of embodiments of the disclosure, the implementation is simple and convenient, the popularization is convenient, and the application range is wide.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for preprocessing an image, comprising:
obtaining a current data frame captured through a camera by a pre-created drawing surface window, wherein the pre-created drawing surface window is called by a central processing unit (CPU) in response to a preview activating instruction of the camera;
converting the current data frame into a preview texture corresponding to the current data frame by the pre-created drawing surface window; and
sending the preview texture corresponding to the current data frame to a graphics processing unit (GPU), processing, by the GPU, the preview texture corresponding to the current data frame, and sending, by the CPU, the preview texture processed to an advanced driving assistance system (ADAS);
wherein processing the preview texture by the GPU comprises:
converting a color of the preview texture corresponding to the current data frame within a storage space occupied by the GPU by calling a preset shader by the GPU;
converting a pixel format of the preview texture corresponding to the current data frame within the storage space occupied by the GPU; or
scaling a size of the preview texture corresponding to the current data frame within the storage space occupied by the GPU.

2. The method of claim 1, wherein converting the current data frame into the preview texture comprises:
associating the pre-created drawing surface window with a predetermined type of texture; and
converting the current data frame into the preview texture corresponding to the current data frame by the pre-created drawing surface window associated with the predetermined type of texture.

3. The method of claim 1, wherein sending the preview texture processed to the advanced driving assistance system ADAS by the CPU comprises:
copying the preview texture processed from the GPU to the CPU by a preset graphics buffer, and sending the preview texture processed to the ADAS by the CPU.

4. The method of claim 1, further comprising:
drawing the preview texture corresponding to the current data frame on a target screen by a pre-created component associated with the target screen.

5. The method of claim 4, wherein drawing the preview texture corresponding to the current data frame on the target screen by the pre-created component associated with the target screen comprises:
setting a drawing surface window in the pre-created component associated with the target screen as the pre-created drawing surface window; and
drawing the preview texture corresponding to the current data frame on the target screen by setting the drawing surface window as the component of the pre-created drawing surface window.

6. The method of claim 1, further comprising:
creating a graphics library thread by calling a thread creation function, and configuring a window management environment of an open graphics library of the graphics library thread by calling a start function through the graphics library thread; and
creating a drawing surface window for camera preview as the pre-created drawing surface window in the graphics library thread for configuring the window management environment of the open graphics library.

7. An electronic device, comprising:
at least one processor; and
a memory, communicatively coupled to the at least one processor,
wherein the memory is configured to store instructions executable by the at least one processor, and when the instructions are executed by the at least one processor, the at least one processor is configured to:
obtain a current data frame captured through a camera by a pre-created drawing surface window, wherein the pre-created drawing surface window is called by a central processing unit (CPU) in response to a preview activating instruction of the camera;
convert the current data frame into a preview texture corresponding to the current data frame by the pre-created drawing surface window; and
send the preview texture corresponding to the current data frame to a graphics processing unit (GPU);
wherein the GPU is configured to process the preview texture corresponding to the current data frame; and
the CPU is configured to send the preview texture processed to an advanced driving assistance system (ADAS); the GPU is further configured to: convert a color of the preview texture corresponding to the current data frame within a storage space occupied by the GPU by calling a preset shader by the GPU; convert a pixel format of the preview texture corresponding to the current data frame within the storage space occupied by the GPU;
or scale a size of the preview texture corresponding to the current data frame within the storage space occupied by the GPU.

8. The electronic device of claim 7, wherein the at least one processor is further configured to:
associate the pre-created drawing surface window with a predetermined type of texture; and
convert the current data frame into the preview texture corresponding to the current data frame by the pre-created drawing surface window associated with the predetermined type of texture.

9. The electronic device of claim 7, wherein the at least one processor is further configured to:
copy the preview texture processed from the GPU to the CPU by a preset graphics buffer, and send the preview texture processed to the ADAS by the CPU.

10. The electronic device of claim 7, wherein the at least one processor is further configured to:
draw the preview texture corresponding to the current data frame on a target screen by a pre-created component associated with the target screen.

11. The electronic device of claim 10, wherein the at least one processor is further configured to:
set a drawing surface window in the pre-created component associated with the target screen as the pre-created drawing surface window; and
draw the preview texture corresponding to the current data frame on the target screen by setting the drawing surface window as the component of the pre-created drawing surface window.

12. The electronic device of claim 7, wherein the at least one processor is further configured to:
create a graphics library thread by calling a thread creation function, and configure a window management environment of an open graphics library of the graphics library thread by calling a start function through the graphics library thread; and create a drawing surface window for camera preview as the pre-created drawing surface window in the graphics library thread for configuring the window management environment of the open graphics library.

13. A non-transitory computer readable storage medium having computer instructions stored thereon, wherein the computer instructions are configured to cause a computer to execute the method for preprocessing the image, the method comprising:

obtaining a current data frame captured through a camera by a pre-created drawing surface window, wherein the pre-created drawing surface window is called by a central processing unit (CPU) in response to a preview activating instruction of the camera;

converting the current data frame into a preview texture corresponding to the current data frame by the pre-created drawing surface window; and sending the preview texture corresponding to the current data frame to a graphics processing unit (GPU), processing, by the GPU, the preview texture corresponding to the current data frame, and sending, by the CPU, the preview texture processed to an advanced driving assistance system (ADAS);

wherein processing the preview texture by the GPU comprises:

converting a color of the preview texture corresponding to the current data frame within a storage space occupied by the GPU by calling a preset shader by the GPU;

converting a pixel format of the preview texture corresponding to the current data frame within the storage space occupied by the GPU; or scaling a size of the preview texture corresponding to the current data frame within the storage space occupied by the GPU.

14. The non-transitory computer readable storage medium of claim 13, wherein converting the current data frame into the preview texture comprises:

associating the pre-created drawing surface window with a predetermined type of texture; and converting the current data frame into the preview texture corresponding to the current data frame by the pre-created drawing surface window associated with the predetermined type of texture.

15. The non-transitory computer readable storage medium of claim 13, wherein sending the preview texture processed to the advanced driving assistance system ADAS by the CPU comprises:

copying the preview texture processed from the GPU to the CPU by a preset graphics buffer, and sending the preview texture processed to the ADAS by the CPU.

16. The non-transitory computer readable storage medium of claim 13, wherein the method further comprises:

drawing the preview texture corresponding to the current data frame on a target screen by a pre-created component associated with the target screen.

17. The non-transitory computer readable storage medium of claim 16, wherein drawing the preview texture corresponding to the current data frame on the target screen by the pre-created component associated with the target screen comprises:

setting a drawing surface window in the pre-created component associated with the target screen as the pre-created drawing surface window; and drawing the preview texture corresponding to the current data frame on the target screen by setting the drawing surface window as the component of the pre-created drawing surface window.

* * * * *